United States Patent Office 2,964,776
Patented Dec. 20, 1960

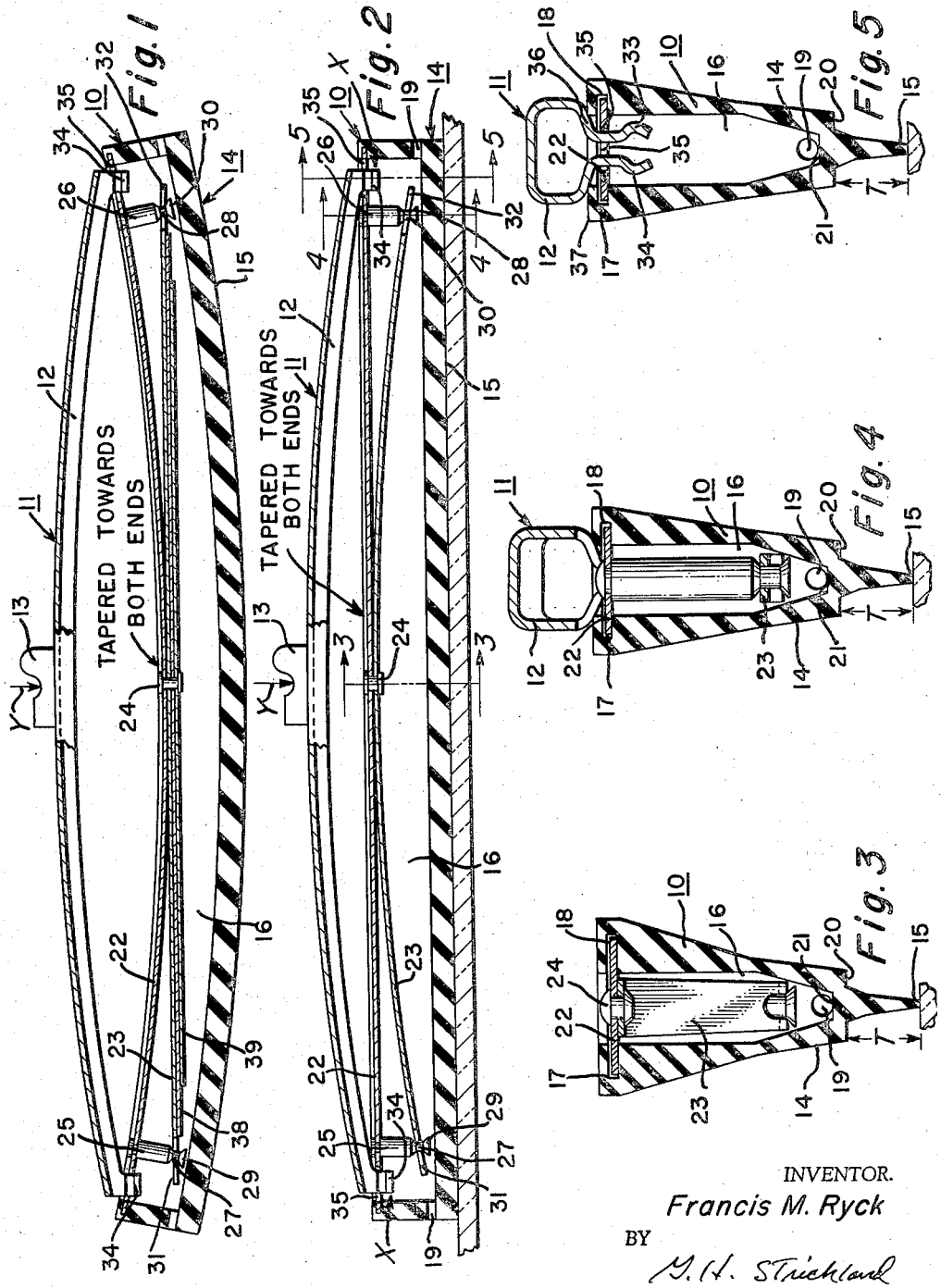

2,964,776
WINDSHIELD WIPER BLADE

Francis M. Ryck, Rochester, N.Y., assignor to General Motors Corporation, Detroit, Mich., a corporation of Delaware Filed July 26, 1957, Ser. No. 674,510
15 Claims. (Cl. 15—250.42)

This invention pertains to windshield wipers, and particularly to a wiper blade for cleaning curved as well as flat surfaces.

Heretofore, it has been conventional to incorporate a single flexible backing member, usually of resilient material such as metal or plastic, in a flexible wiper blade assembly, which backing permits flexure of the squeegee unit in a plane normal to the surface to be wiped while preventing flexure in a plane parallel to the surface to be wiped. The present invention relates to a flexible blade assembly embodying a pair of coacting backing members which are disposed within a backing chamber of a rubber wiping element, or squeegee. In addition, one of the backing members is precurved, or preflexed, while the other backing member is normally flat or planar. Accordingly, among my objects are the provision of a wiper blade assembly including a squeegee unit and a pressure applying superstructure having internal connections with the squeegee unit for permitting limited tilting therebetween; the further provision of a squeegee unit for a flexible wiper blade having a pair of coacting flexible backings, the further provision of a rubber wiping element having a backing chamber having means to drain water therefrom and means for locating and controlling the trimming dimension of the wiping edge, and the still further provision of a wiper blade assembly having a squeegee unit with a preflexed backing assembly and a superstructure operatively connected with the backing assembly for applying arm pressure thereto to conform the squeegee unit to the surface to be cleaned.

The aforementioned and other objects are accomplished in the present invention by utilizing a backing assembly comprising a flat strip, or multiple flat strip assembly, and a preflexed strip in superposed relation, the strips being rigidly connected together intermediate their ends and movably connected adjacent their ends. Specifically, in both embodiments of the present invention the rubber wiping element, or squeegee, has a laterally flexible wiping edge along one side and a backing chamber molded along the opposite side. The backing chamber terminates short of the ends of the squeegee and includes a pair of coplanar slots, or grooves, adjacent the top thereof for receiving one of the flexible backings, and one or more drain holes adjacent each end of the backing chamber for draining water therefrom. In addition, the squeegee is formed with abrupt shoulder means which extend longitudinally throughout the length thereof between the body portion and the wiping edge, or lip, which shoulder can be used for locating and controlling the trimming dimension of the wiping edge.

The backing chamber receives a backing assembly, which in one embodiment comprises a normally precurved spring metal backing strip and a normally flat spring metal backing strip. Both backing strips are nonuniformly flexible by reason of their being tapered towards both ends from the middle. In addition, the backing strips have a greater width than thickness so as to be flexible in a plane normal to the surface to be wiped while substantially inflexible in a plane at right angles thereto. The precurved backing strip has a reverse curvature, that is the strip defines a convex curve as regards the surface of the windshield to be cleaned, and the precurved strip is situated within the grooves or slots of the backing element. The normally flat strip is disposed within the backing chamber and is slightly shorter than the precurved backing strip.

The two strips are rigidly connected intermediate their ends by means of a rivet. In addition, the precurved strip has a pair of elongate rivets attaching adjacent ends thereof which include reduced shanks with headed ends that are received in longitudinal slots in the normally straight backing strip, so that the ends of the two backing members are movably connected. In addition, the normally curved backing strip has a slot adjacent each end thereof which is adapted to receive the connecting means of the pressure applying superstructure. The connections between the superstructure and the backing strip are of the type shown in my copending application Serial No. 624,095, filed November 23, 1956, now Patent No. 2,920,335.

The superstructure for the blade assembly of this invention comprises a yoke, or holder, having an arm attaching clip connected to the intermediate portion thereof for receiving arm pressure, each end of the yoke, or holder, which is of channeled cross-section, having spring clips which extend through the elongated slots in the precurved backing strip. The connecting means between the superstructure and the squeegee unit permit tilting movement of the squeegee unit relative to the superstructure, and limit the tilting movement of the squeegee unit to the proper lean, or drag, position of the wiper blade during wiping operation.

In the second embodiment, the normally straight backing strip comprises an assembly of a plurality of stacked leaf springs of different lengths, which may be utilized to distribute the arm pressure to better advantage where the surface to be cleaned is of extreme curvature. In both embodiments, the blade assembly possesses lateral stability thereby resisting tilting due to the strut-like assembly of the backing. Furthermore, the precurved backing normally deforms the squeegee unit so that the wiping edge is convex as regards the surface to be wiped. A predetermined arm pressure is required to conform the blade assembly to a flat surface, and when such a force is applied to the holder the force at the ends of the squeegee unit is zero. However, thereafter any additional arm applied pressure is divided equally between opposite ends of the squeegee unit thereby enabling the squeegee unit to conform to the surface to be cleaned.

Further objects and advantages of the present invention will be apparent from the following description, reference being had to the accompanying drawing, wherein preferred embodiments of the present invention are clearly shown.

In the drawing:

Figure 1 is a view partly in elevation and partly in section depicting a wiper blade assembly constructed according to one embodiment of this invention in its normal shape.

Figure 2 is a view partly in section and partly in elevation depicting a wiper blade assembly constructed according to another embodiment of this invention engaging a flat surface.

Figures 3, 4 and 5 are sectional views taken along lines 3—3, 4—4 and 5—5, respectively, of Figure 2.

With particular reference to Figure 1, the wiper blade assembly includes a squeegee unit depicted by the numeral 10 and an arm pressure applying superstructure depicted by the numeral 11. The superstructure 11 comprises a channeled yoke, or holder, 12 having a suitable arm attaching clip 13 connected to an intermediate portion thereof, the arrangement being such that the arm pressure is applied at the center of the yoke 12 as depicted by the arrow Y in Figures 1 and 2.

The squeegee unit 10, in both embodiments of this invention, includes a rubber wiping element, or squeegee, 14 having a laterally flexible wiping edge, or lip, 15 along one side as clearly shown in Figures 3 through 5, and a backing chamber 16 which terminates short of the ends of the squeegee. The backing chamber 16 is open at the back edge of the squeegee opposite that of the wiping edge 15, and is formed with a pair of co-planar slots 17 and 18 adjacent the top thereof which connect with the backing chamber. In addition, the squeegee 14 has at least one hole 19 at each end thereof in alignment with the bottom of the backing chamber 16 for draining water therefrom. The squeegee 14 is formed with abrupt shoulder means 20 intermediate the wiping edge and the backing chamber, which shoulder means can be used for locating and controlling the trimming dimension indicated by the letter T in Figures 3 through 5. The bottom wall 21 of the backing chamber, or cavity, 16 may also be used to control the trimming dimension of the wiping lip 15, if desired.

In one embodiment, as shown in Figures 2 through 5, the squeegee 14 receives a backing assembly comprising a normally precurved spring metal backing strip 22 and a normally flat backing strip 23. The backing strips 22 and 23 have a greater width than thickness so as to be flexible in a plane normal to the surface to be wiped while inflexible in a plane parallel to such surface. In addition, the backing strips are nonuniformly flexible by reason of being tapered from the middle towards both ends as clearly shown in Figures 3 through 5. The precurved backing strip 22 has a reverse curvature in the normal condition of the wiper blade assembly as shown in Figure 1 so that the squeegee unit 10 is normally deformed so that the wiping edge defines a convex curve as shown in Figure 1.

The backing strips 22 and 23 are rigidly connected at their centers by means of a rivet 24. The precurved backing strip 22 has a pair of elongated rivets 25 and 26 attached thereto adjacent its ends, which rivets are formed with reduced shank portions 27 and 28, respectively, and head portions 29 and 30, respectively. The reduced shank portions 27 and 28 are received in longitudinally extending slots 31 and 32 adjacent opposite ends of the normally flat backing strip 23. The connections between the rivets 25 and 26 and the backing strip 23 permit relative movement therebetween to enable the squeegee unit to conform to a curved surface as well as a flat surface.

Each end of the primary yoke 12 is formed with integral spring clips 33 and 34 adapted to extend through elongated slots 35 adjacent each end of the precurved backing strip 22. The connections between the pressure applying superstructure and the backing strip 22 are of the type disclosed in my aforementioned copending application, and result in a structure wherein the pressure is applied directly to the backing strip 22, internally of the squeegee unit. The portions 36 and 37 of the spring clips are engageable with the backing strip 22 so as to positively limit tilting movement of the squeegee unit 10 relative to the superstructure 11 to the proper lean, or drag, position during movement of the wiper blade assembly across a windshield.

Referring again to Figure 1, in a second embodiment the backing assembly likewise includes a precurved backing strip 22, the flat backing strip comprising a plurality of stacked, or laminated leaf springs 23, 38 and 39. The strip 23 is identical with the strip disclosed in Figure 2, while the strips 38 and 39 are of different lengths but are likewise tapered from the middle towards the ends so as to be nonuniformly flexible. The leaf spring strip 38 is somewhat longer than leaf spring 39 and both are shorter than the strip 23. The laminated flat backing strip of Figure 1 may be used to better advantage where the curved surface to be wiped requires the application of higher arm pressure. In all other respects the blade assembly of Figure 1 is identical with the blade assembly of Figure 2.

Since the precurved backing strip 22 normally deforms the squeegee unit 10 to the shape shown in Figure 1, a predetermined arm pressure applied at Y is required to conform the squeege unit to a flat surface as shown in Figure 2. Any additional pressure applied at point Y is equally divided by the yoke 11 between the ends thereof and is applied as indicated by arrows X to the backing strip 22. The initial force required to conform the squeegee unit to a flat surface is dependent upon the configuration and material of the backing assembly. Any pressure in addition to the pressure required to conform the blade assembly to a flat surface as shown in Figure 2 will be equally divided and applied along the arrows X to the backing strip 22. For example, if four ounces at arrow Y is required to conform the blade assembly to a flat surface as shown in Figure 2, when four ounces is applied at arrow Y the pressure at the ends of the yoke, namely arrows X will be zero. However, if the pressure applied at Y is eight ounces, the pressure at arrows X at each end of the blade will be two ounces, which pressure is utilized to conform the squeegee unit to the surface to be cleaned.

While the embodiments of the invention as herein disclosed constitutes preferred forms, it is to be understood that other forms might be adopted, as may come within the scope of the claims which follow:

What is claimed is as follows:

1. A squeegee unit including, an elongate blade body having a longitudinally extending wiping edge and a backing chamber, and a flexible backing assembly arranged in said backing chamber for effecting conformance to a curved surface under the pressure of a supporting structure, said backing assembly including precurved and flat strip members, said strip members being movably connected adjacent their ends and rigidly connected intermediate their ends.

2. A squeegee unit including, an elongate blade body having a longitudinally extending wiping edge and a backing chamber, said backing chamber having a pair of co-planar backing strip receiving grooves communicating therewith, and a flexible backing assembly arranged within said backing chamber comprising precurved and flat strip members, the precurved strip member having its marginal edge disposed within said grooves, said strip members being movably connected adjacent their ends and rigidly connected intermediate their ends.

3. A squeegee unit including, an elongate blade body having a longitudinally extending wiping edge and a backing chamber, said backing chamber having a pair of co-planar backing strip receiving grooves communicating therewith, and a flexible backing assembly arranged in said backing chamber comprising precurved and flat strip members of nonuniform flexibility by reason of their varying cross-sectional area from the medial portions thereof towards the end thereof, said precurved strip having its marginal edges disposed within said grooves, said strip members being movably connected adjacent their ends and rigidly connected intermediate their ends.

4. A subassembly for a flexible wiper blade including, a backing assembly comprising an elongate precurved flexible strip having elongated closed slots adjacent its ends and a normally flat backing strip, means rigidly interconnecting said strips intermediate their ends, means movably interconnecting said strips adjacent their ends, and a pressure applying superstructure comprising a yoke having spring clips at opposite ends, said spring clips being arranged to be received in the elongate slots in said precurved strip.

5. A subassembly for a flexible wiper blade including, a flexible backing assembly comprising precurved elongate flexible strip having elongated closed slots adjacent its ends and a normally flat laminated strip assembly comprising a plurality of leaf springs of different lengths, means rigidly connecting said precurved strip and said laminated strip assembly intermediate the ends thereof, means movably connecting said precurved strip and said laminated strip assembly adjacent their ends, and a pressure applying superstructure comprising a yoke having integral spring clips at opposite ends thereof adapted to be received in the elongated slots of said precurved strip.

6. A subassembly for a flexible wiper blade including, a backing assembly comprising an elongate precurved flexible strip having closed slots adjacent its ends and a normally flat backing strip, means rigidly interconnecting said strips intermediate their ends, means movably interconnecting said strips adjacent their ends, and a pressure applying superstructure having connector means at opposite ends disposed within the slots of said precurved strip.

7. A subassembly for a flexible wiper blade including, a backing assembly comprising an elongate precurved flexible strip having closed slots adjacent its ends and a normally flat backing strip, means rigidly interconnecting said strips intermediate their ends, means movably interconnecting said strips adjacent their ends, and a pressure applying superstructure comprising a holder having spring clips at opposite ends, said spring clips extending through the slots in said precurved strip and being engageable therewith to limit tilting movement of said backing assembly relative to the holder.

8. A subassembly for a flexible wiper blade including, a flexible backing assembly comprising a precurved elongate flexible strip having closed slots adjacent its ends and a normally flat laminated strip assembly comprising a plurality of leaf springs of different lengths, means rigidly connecting said precurved strip and said laminated strip assembly intermediate the ends thereof, means movably connecting said precurved strip and said laminated strip assembly adjacent their ends, and a pressure applying superstructure having a connector means at opposite ends thereof disposed within the slots of said precurved strip.

9. A flexible wiper blade assembly including, an elongate wiping element, a backing assembly supporting said wiping element comprising an elongate precurved flexible strip and a normally flat backing strip, means rigidly interconnecting said strips intermediate their ends, means movably interconnecting said strips adjacent their ends, and a pressure distributing superstructure operatively connected with said precurved strip adjacent the ends thereof for applying conforming pressure thereto.

10. A flexible wiper blade assembly including, an elongate wiping element, a backing assembly supporting said wiping element comprising an elongate precurved flexible strip having closed slots adjacent its ends and a normally flat backing strip, means rigidly interconnecting said strips intermediate their ends, means movably interconnecting said strips adjacent their ends, and a pressure applying superstructure having connector means at its ends disposed within the slots of said precurved strip for applying conforming pressure thereto.

11. A flexible wiper blade assembly including, an elongate wiping element, a backing assembly supporting said wiping element comprising an elongate precurved flexible strip having closed slots adjacent its ends and a normally flat backing strip, means rigidly interconnecting said strips intermediate their ends, means movably interconnecting said strips adjacent their ends, and a pressure applying superstructure comprising a holder having spring clips at opposite ends, said spring clips being disposed within the slots of said precurved strip and engageable therewith to limit tilting movement of said backing assembly and the wiping element relative to said holder.

12. A flexible wiper blade assembly including, an elongate wiping element having a wiping edge along one margin and a backing chamber along the opposite margin, said backing chamber having a pair of coplanar backing strip receiving grooves communicating therewith, a flexible backing assembly supporting said wiping element comprising an elongate precurved flexible strip and a normally flat backing strip, said precurved flexible strip having its marginal edges disposed within the grooves of said wiping element, means rigidly interconnecting said strips intermediate their ends, means movably interconnecting said strips adjacent their ends, and a pressure applying superstructure operatively connected with said precurved strip adjacent its ends for applying conforming pressure thereto.

13. The wiper blade assembly set forth in claim 12 wherein said precurved flexible strip has closed slots adjacent its ends, and wherein said pressure applying superstructure includes connector means at its ends disposed within the slots of said precurved strip.

14. The wiper blade assembly set forth in claim 12 wherein said precurved strip and said flat strip are of varying cross-sectional area so as to be nonuniformly flexible.

15. The wiper blade assembly set forth in claim 14 wherein said precurved strip and said flat strip have their greatest cross-sectional area in the medial portion and their least cross-sectional area adjacent the ends thereof.

References Cited in the file of this patent

UNITED STATES PATENTS

| | | |
|---|---|---|
| 1,812,661 | McIntosh | June 30, 1931 |
| 2,543,383 | Scinta et al. | Feb. 27, 1951 |
| 2,700,785 | Oishei et al. | Feb. 1, 1955 |
| 2,712,146 | Wise | July 5, 1955 |
| 2,772,436 | Diebel | Dec. 4, 1956 |

FOREIGN PATENTS

| | | |
|---|---|---|
| 619,320 | Great Britain | Mar. 8, 1949 |